(12) United States Patent
Kapur et al.

(10) Patent No.: US 7,340,460 B1
(45) Date of Patent: Mar. 4, 2008

(54) VECTOR ANALYSIS OF HISTOGRAMS FOR UNITS OF A CONCEPT NETWORK IN SEARCH QUERY PROCESSING

(75) Inventors: Shyam Kapur, Sunnyvale, CA (US); Deepa Joshi, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 470 days.

(21) Appl. No.: 10/797,586

(22) Filed: Mar. 9, 2004

Related U.S. Application Data

(60) Provisional application No. 60/460,222, filed on Apr. 4, 2003.

(51) Int. Cl.
*G06F 17/30* (2006.01)
(52) U.S. Cl. .......................... 707/5; 707/100
(58) Field of Classification Search ............... 707/2–5, 707/10, 100
See application file for complete search history.

(56) References Cited

U.S. PATENT DOCUMENTS

| | | | |
|---|---|---|---|
| 6,006,321 A | 12/1999 | Abbott | 707/5 |
| 6,076,088 A | 6/2000 | Paik et al. | 707/5 |
| 6,078,618 A * | 6/2000 | Yokoyama et al. | 375/240 |
| 6,311,181 B1 * | 10/2001 | Lee et al. | 707/5 |
| 6,363,373 B1 | 3/2002 | Steinkraus | 707/3 |
| 6,539,348 B1 | 3/2003 | Bond | 704/9 |
| 6,675,159 B1 | 1/2004 | Lin et al. | 707/3 |
| 6,694,311 B1 * | 2/2004 | Smith | 707/4 |
| 6,772,150 B1 | 8/2004 | Whitman et al. | 707/6 |
| 6,865,295 B2 * | 3/2005 | Trajkovic | 382/170 |
| 2003/0069880 A1 | 4/2003 | Harrison et al. | 707/3 |

* cited by examiner

*Primary Examiner*—Cheryl Lewis
(74) *Attorney, Agent, or Firm*—Seth H. Ostrow; Dreier LLP

(57) ABSTRACT

A set of concept networks is generated, with each concept network based on a different group of queries. From these concept networks, histogram vectors are defined for various units, where a unit's histogram vector reflects the frequency of occurrence of that unit in the different concept networks. Analysis of histogram vectors for different units across the same set of concept networks can enable detection of patterns of user behavior that can be used in responding to a subsequently received query.

23 Claims, 11 Drawing Sheets

| UNIT | HISTOGRAM VECTOR | DECIMAL |
|---|---|---|
| Halloween | 1 1 1 1 1 1 1 1 1 | 511 |
| Halloween Party | 0 0 1 1 1 0 1 1 0 | 112 |
| Halloween Candy | 0 0 0 1 1 1 0 0 0 | 56 |
| Halloween Costume | 0 0 1 1 1 0 1 0 0 | 112 |
| Halloween Mike Myers | 1 1 1 1 1 1 1 0 0 | 588 |
| ⋯ | ⋯ | ⋯ |

FIG. 11A

VECTOR ANALYSIS OF HISTOGRAMS FOR UNITS OF A CONCEPT NETWORK IN SEARCH QUERY PROCESSING

CROSS-REFERENCES TO RELATED APPLICATIONS

The present disclosure is related to the following commonly assigned U.S. applications: Ser. No. 10/713,576 U.S. Pat. No. 7,051,023 filed Nov. 12, 2003, entitled "Systems and Methods for Generating Concept Units from Search Queries"; Ser. No. 10/712,307 U.S. Pat. No. 7,240,049, filed Nov. 12, 2003, entitled "Systems and Methods for Search Query Processing Using Trend Analysis"; U.S. Pat. No. 10/797,614, filed Mar. 9, 2004, entitled "Systems and Methods for Search Processing Using Superunits"; and Provisional Application No. 60/460,222, filed Apr. 4, 2003, entitled "Universal Search Interface Systems and Methods." The respective disclosures of these applications are incorporated herein by reference in their entirety for all purposes.

BACKGROUND OF THE INVENTION

The present invention relates generally to network and Internet search and interface systems and more particularly to search systems that provide enhanced search functionality.

With the advent of the Internet and the multitude of web pages and media content available to a user over the World Wide Web (web), there has become a need to provide users with streamlined approaches to filter and obtain desired information from the web. Search systems and processes have been developed to meet the needs of users to obtain desired information. Examples of such technologies can be accessed through Yahoo!, Google and other sites. Typically, a user inputs a query and a search process returns one or more links (in the case of searching the web), documents and/or references (in the case of a different search corpus) related to the query. The links returned may be closely related, or they may be completely unrelated, to what the user was actually looking for. The "relatedness" of results to the query may be in part a function of the actual query entered as well as the robustness of the search system (underlying collection system) used. Relatedness might be subjectively determined by a user or objectively determined by what a user might have been looking for.

Queries that users enter are typically made up of one or more words. For example, "hawaii" is a query, so is "new york city", and so is "new york city law enforcement". As such, queries as a whole are not integral to the human brain. In other words, human beings do not naturally think in terms of queries. They are an artificial construct imposed, in part, by the need to query search engines or look up library catalogs. Human beings do not naturally think in terms of just single words either. What human beings think in terms of are natural concepts. For example, "hawaii" and "new york city" are vastly different queries in terms of length as measured by number of words but they share one important characteristic: they are each made up of one concept. The query "new york city law enforcement" is different, however, because it is made up of two distinct concepts "new york city" and "law enforcement".

Human beings also think in terms of logical relationships between concepts. For example, "law enforcement" and "police" are related concepts since the police are an important agency of law enforcement; a user who types in one of these concepts may be interested in sites related to the other concept even if those sites do not contain the particular word or phrase the user happened to type. As a result of such thinking patterns, human beings by nature build queries by entering one or more natural concepts, not simply a variably long sequence of single words, and the query generally does not include all of the related concepts that the user might be aware of. Also, the user intent is not necessarily reflected in individual words of the query. For instance, "law enforcement" is one concept, while the separate words "law" and "enforcement" do not individually convey the same user intent as the words combined.

Current technologies at any of the major search providers, e.g., MSN, Google or any other major search engine site, do not understand queries the same way that human beings create them. For instance, existing search engines generally search for the exact words or phrases the user entered, not for the underlying natural concepts or related concepts the user actually had in mind. This is perhaps the most important reason that prevents search providers from identifying a user's intent and providing optimal search results and content.

As can be seen there is a need for improved search and interface technology that aids in providing results that are more in line with the actual concepts in which a user may be interested and a better user experience.

BRIEF SUMMARY OF THE INVENTION

Embodiments of the present invention provide systems and methods for processing search requests, including analyzing received queries in order to provide a more sophisticated understanding of the information being sought. A concept network is generated from a set of queries by parsing the queries into units and defining various relationships between the units, e.g., based on patterns of units that appear together in queries. A number of different concept networks corresponding to different sets of queries (e.g., representing different time periods or different geographic areas) can be generated. From these concept networks, histogram vectors are defined for various units, where a unit's histogram vector reflects the frequency of occurrence of the unit in the different concept networks. Analysis of histogram vectors for different units across a set of concept networks can enable detection of patterns of user activity that can be used in responding to a subsequently received query.

According to one aspect of the present invention, a computer-implemented method for analyzing user search queries is provided. A set of previous queries is grouped into a plurality of subsets along a dimension. For each of the subsets of the previous queries, a concept network is generated. Each concept network includes a plurality of units and a plurality of relationships defined between the units, and each unit of each concept network has a frequency weight. One of the units is selected, and a histogram vector is constructed for the selected unit. The histogram vector has an element corresponding to each of the concept networks; each element of the histogram vector has a value representative of the frequency weight of the selected unit in the corresponding one of the concept networks. The previous queries may be grouped along various dimensions, such as a time dimension, a dimension defined by reference to one or more demographic characteristics of users, a geographic dimension, or a vertical dimension representing a user context of the query (e.g., shopping or travel).

In some embodiments, the selected unit may be stored in a unit dictionary in association with the histogram vector. Histogram vectors may be generated and stored for any number of units. In some embodiments, a subsequent query may be received and parsed into one or more constituent units. The histogram vector for at least one of the constituent units is obtained from the unit dictionary; and a response to the subsequent query is based at least in part on the histogram vector.

According to another aspect of the present invention, a system for processing queries includes a concept network builder module and a histogram builder module. The concept network builder module is configured to receive a set of previous user queries and to generate a concept network therefrom. The concept network includes a plurality of units and a plurality of relationships defined between the units, and each unit of the concept network has a frequency weight. The histogram builder module is configured to receive a number of concept networks generated by the concept network builder from different sets of previous user queries and is further configured to select one of the units and to generate a histogram vector for the selected unit. The histogram vector has an element corresponding to each of the concept networks, and each element of the histogram vector has a value representative of the frequency weight of the unit in the corresponding one of the concept networks.

The following detailed description together with the accompanying drawings will provide a better understanding of the nature and advantages of the present invention.

BRIEF DESCRIPTION OF THE DRAWINGS

FIGS. 11A-B illustrate an application of the process of FIG. 7; FIG. 8A is a table showing examples of histogram vectors obtained during the process of FIG. 7, and FIG. 8B is a bar chart showing frequencies of occurrence of histogram vectors.

DETAILED DESCRIPTION OF THE INVENTION

I. Overview

A. Network Implementation

Figure 1:
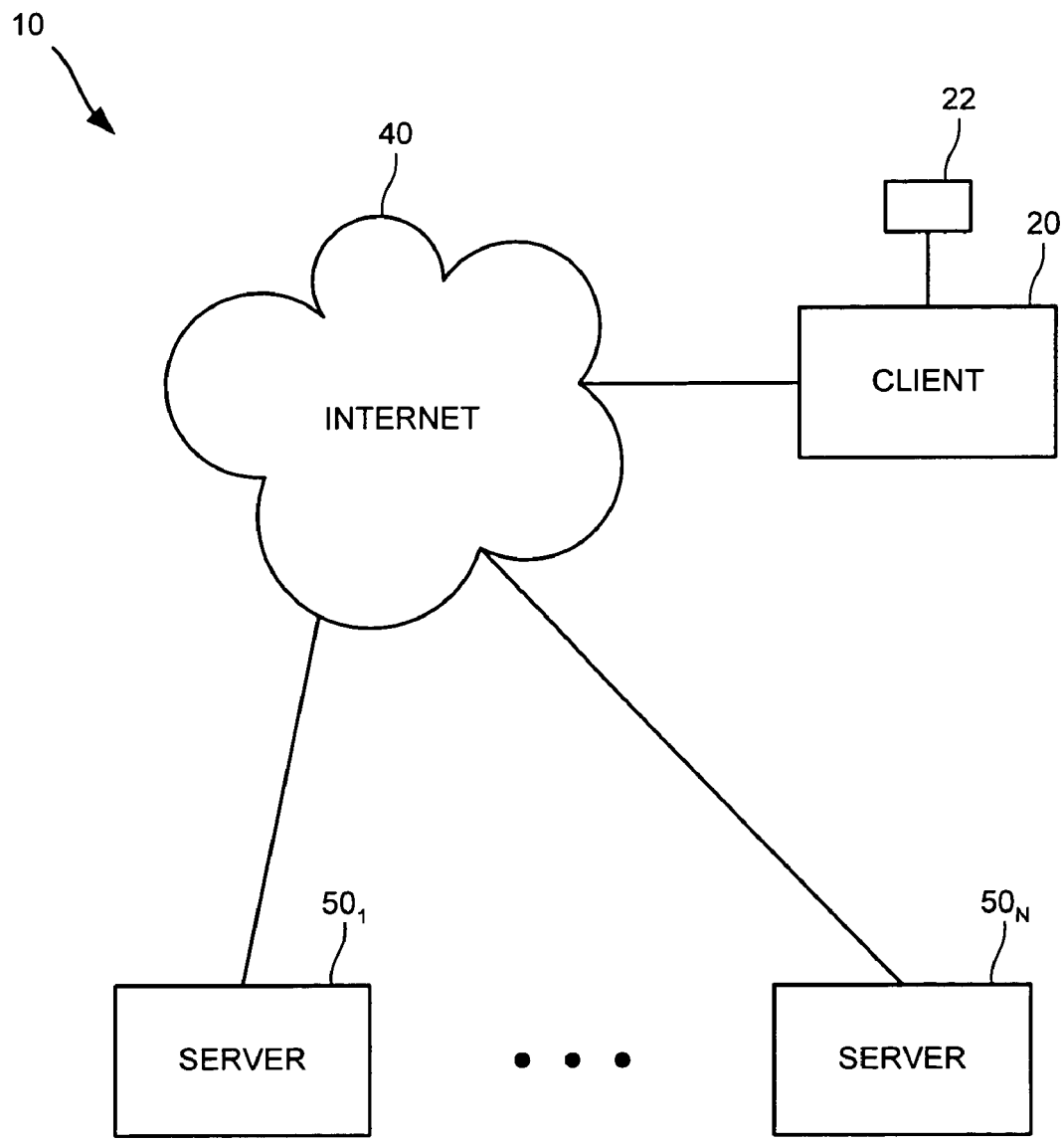
FIG. 1 is a simplified high-level block diagram of an information retrieval and communication system according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search System

Figure 2:
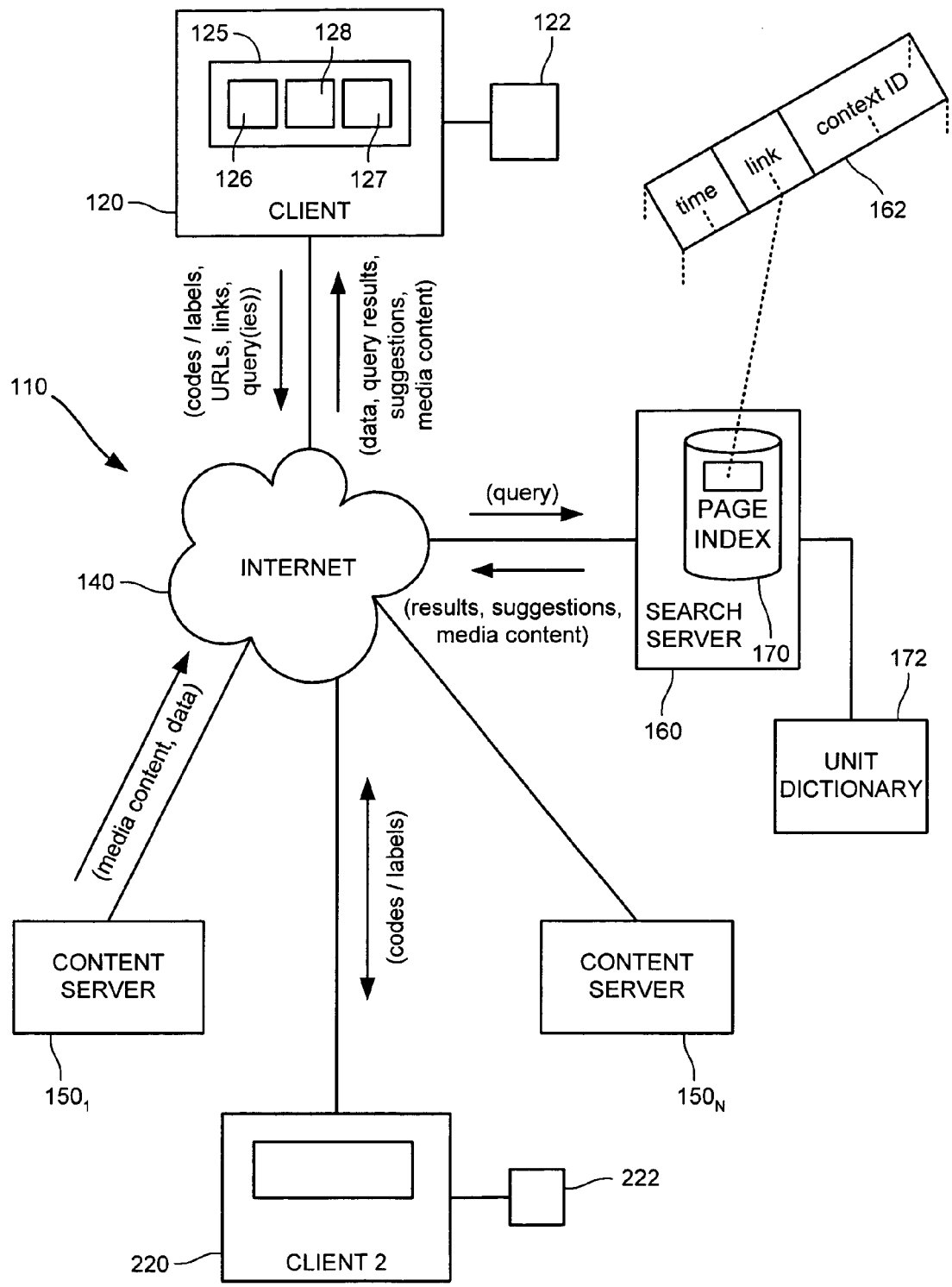
FIG. 2 is a simplified block diagram of an information retrieval and communication network for communicating media content according to an embodiment of the present invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As discussed above, client system 120 and its components are configured to communicate with server systems 150 and 160 and other server systems over the Internet 140 or other communication networks.

1. Client System

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as discussed above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of various applications executing on client system 120 for which application interface module 128 is preferably configured to interface with according to aspects of the present invention include various e-mail applications, instant messaging (IM) applications, browser applications, document management applications and others. Further, interface module 127 may include a browser, such as a default browser configured on client system 120 or a different browser. In some embodiments, client application module 125 provides features of a universal search interface as described in the above-referenced Provisional Application No. 60/460,222.

2. Search Server System

According to one embodiment, search server system 160 is configured to provide search result data and media content to client system 120, and content server system 150 is configured to provide data and media content such as web pages to client system 120, for example, in response to links selected in search result pages provided by search server system 160. In some variations, search server system 160 returns content as well as, or instead of, links and/or other references to content. Search server system 160 is also preferably configured to record user query activity in the form of query log files described below.

Search server system 160 in one embodiment references various page indexes 170 that are populated with, e.g., pages, links to pages, data representing the content of indexed pages, etc. Page indexes may be generated by various collection technologies including automatic web crawlers, spiders, etc., as well as manual or semi-automatic classification algorithms and interfaces for classifying and ranking web pages within a hierarchical structure. These technologies may be implemented on search server system 160 or in a separate system (not shown) that generates a page index 170 and makes it available to search server system 160.

An entry 162 in page index 170 includes a search term, a link (or other encoded identifier) to a page in which that term appears and a context identifier for the page. The context identifier may be used for grouping similar results for search terms that may have different meanings in different contexts. For example, the search term "java" may refer to the Java computer language, to the Indonesian island of Java, or to coffee (which is often colloquially referred to as java). The context identifier for a page advantageously indicates which of these contexts is applicable. A page link may be associated with multiple context identifiers, so the same page (or a link thereto) may be displayed in multiple contexts. Context identifiers are preferably automatically associated with page links by the system as users perform related searches; however, the identifiers may also be modified and associated with links manually by a team of one or more index editors. In this manner, knowledge gleaned from numerous searches can be fed back into the system to define and re-define contexts to make the displayed search results more valuable and useful to the requesting user.

Search server system 160 is configured to provide data responsive to various search requests received from a client system, in particular from search module 126. For example, search server system 160 may be configured with search related algorithms for processing and ranking web pages relative to a given query (e.g., based on a combination of logical relevance, as measured by patterns of occurrence of the search terms in the query; context identifiers; page sponsorship; etc.). In accordance with embodiments of the present invention, these algorithms include algorithms for concept analysis.

For instance, some embodiments of the present invention analyze search queries and/or results and groups results in contexts for display at the user's computer 120. For example, in response to the search term "Java", some embodiments of search server system 160 return search results grouped into three (or more if other contexts are identified) contexts or word senses: Java the computer language, Java the island, and coffee java. The system may be configured to display the results in sets with links provided in association with each context, or the system may display just the contexts (with enough information to distinguish the contexts to the user) without any links and allow the user to select the desired context to display the associated links. In the Yahoo! network system, for example, a set of contexts might be displayed with each context having a set of links to pages from the search index, links associated with sponsored matches, links associated with directory matches and links associated with Inside Yahoo! (IY) matches.

In addition to words or phrases having ambiguous meanings, such as "Java", some embodiments of the present invention are configured to group results into contexts for search terms that are not necessarily ambiguous. One example is the results returned for the search term "Hawaii". The term "Hawaii" in and of itself might not be ambiguous; however, the character of the results returned for such a term could be very broad, related to every site that discusses or just mentions Hawaii. To provide more useful results to the user, the system of the present invention preferably organizes search results into contexts by leveraging the knowledge of what the results are actually related to. For example, for Hawaii, the system may return results in various context groupings such as "Hawaii: travel", "Hawaii: climate", "Hawaii: geography", "Hawaii: culture", etc. Such context identifiers ("travel," "climate," etc.) may be stored in page index entry 162 as described above.

It will be appreciated that the search system described herein is illustrative and that variations and modifications are possible. The content server and search server system may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

C. Concept Networks

In one embodiment, algorithms on search server system 160 perform concept analysis of search terms to provide more relevant results to the user. For example, for the search phrase "New York City" it is most likely that the user is interested in sites related to New York City (the city or region) as opposed to any other city in the state of New York. Similarly, for "New York City law enforcement" it is most likely that the user is interested in sites related to law enforcement (e.g., segment of jobs) in New York City. However, most conventional search engines would simply search using the individual terms "new", "york", "city", "law" and "enforcement" regardless of the order in which the terms appear in the search phrase. Other conventional search engines might try to find the longest substring in the search phrase that also appears in an index. For example, if the index contained "New York", "New York City" and "New York City law" but not "New York City law enforcement", the search engine would search using "New York City law" and "enforcement", which is not necessarily what the user intended.

Search server system 160 is advantageously configured to detect, in a query such as "New York City law enforcement" the concepts "New York City" and "law enforcement" and to return results for these two concepts. In some embodiments, search server 160 uses the order that search terms are presented in a query to identify its constituent concepts. For example, using "New York City law enforcement" as the search phrase, the system identifies, e.g., by hashing, "New York City" and "law enforcement" as two concepts in the search phrase and returns results for these concepts. The same results would be returned for "law enforcement in New York City." However, for "city law enforcement in New York," different results would be returned based on the concepts "law enforcement" and "New York" and "city," or "city law enforcement" and "New York." Likewise, "enforcement of law in New York City" would be identified as including the concepts "New York City," "law" and "enforcement." Thus, the order of concepts is not so important as the order of terms that make up a concept. In some embodiments, concepts are included in the page index (e.g., as terms and/or context identifiers) or a separate concept index may be implemented. It should be noted that "law enforcement" could be regarded as the same as "enforcement of law" or not depending on the context. In some embodiments, the concepts within a query are advantageously detected by reference to a unit dictionary 172 that contains a list of known concepts (or "units").

Unit dictionary 172 is advantageously generated by a concept discovery process based on some number (preferably a large number, e.g., at least several hundred thousand) of previous queries. Concept discovery involves analysis of the queries to generate a concept network and may be performed by search server 160 or by another server (not shown).

Figure 3:
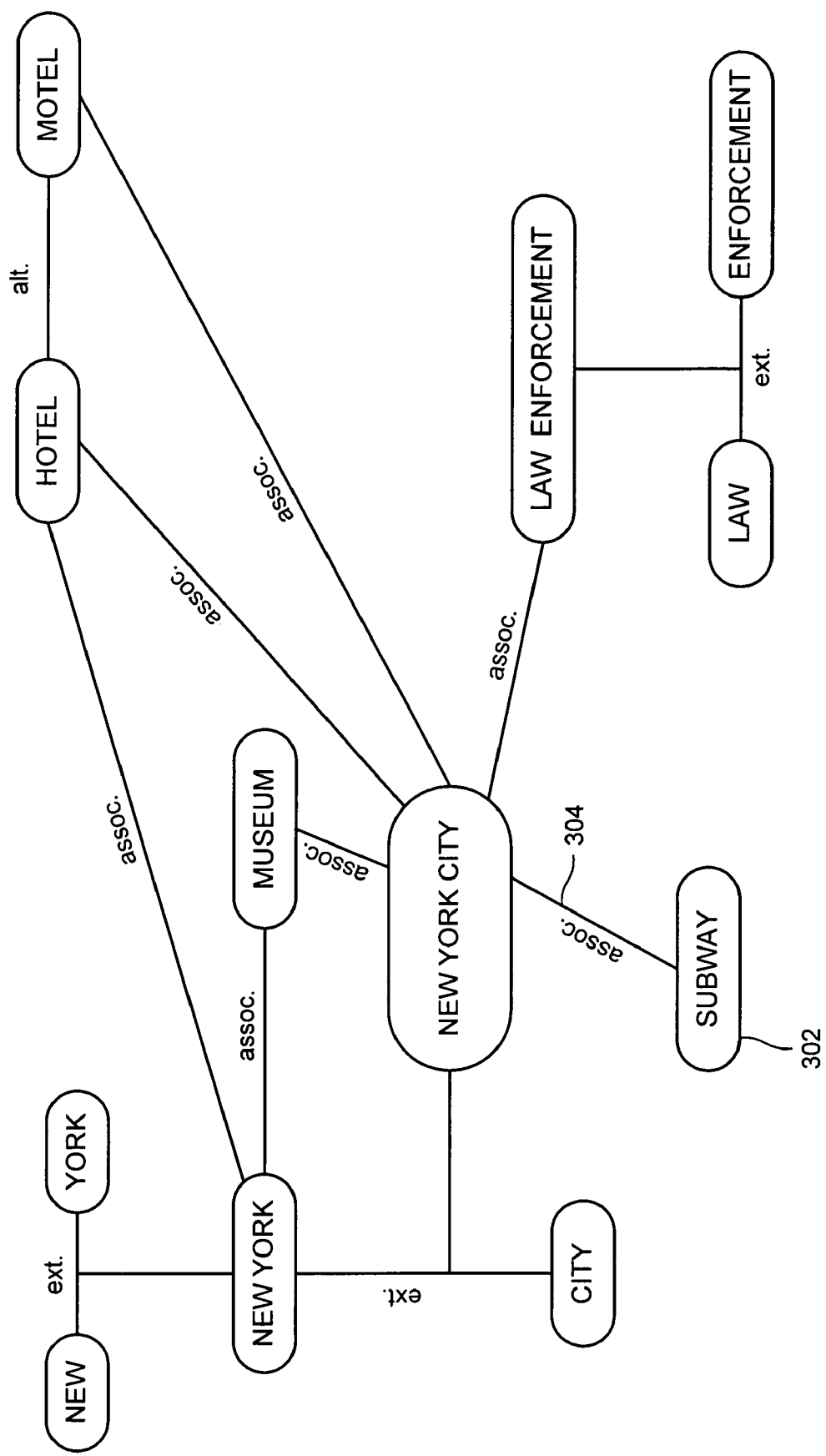
FIG. 3 is a graphical representation of a concept network according to an embodiment of the present invention.

As used herein, the term "concept network" encompasses any representation of relationships among concepts. For example, FIG. 3 is a graphical representation of a concept network 300 for a small number of concepts. Each concept or unit (e.g., "New", "York", "New York City", etc.) is a "node" (e.g., node 302) of the network and is connected to other nodes by "edges" (e.g., edge 304) that represent various relationships between concepts. A concept network can capture a variety of relationships. In the embodiment shown in FIG. 3, the relationships include extensions ("ext"), associations ("assoc"), and alternatives ("alt"); other relationships may also be captured in addition to or instead of those described herein.

An "extension" as used herein is a relationship between two units that exists when the string obtained by concatenating the two units is also a unit. For example, the string obtained by concatenating units "new york" and "city" is "new york city," which is also a unit. The extension relationship is shown in FIG. 3 as a "T" junction, with the crossbar connecting the two units that are related by extension (e.g., "new york" and "city") and the stem connecting to the extension unit (e.g., "new york city").

An "association" as used herein is a relationship that exists between two units that appear in queries together. For example, FIG. 3 shows that unit "hotels" is an association of units "new york" and "new york city". Pairs of associated units are also referred to herein as "neighbors," and the "neighborhood" of a unit is the set of its neighbors. To establish an association between units, a minimum frequency of co-occurrence may be required. It should be noted that the units that are related by association need not appear adjacent to each other in queries and that the string obtained by concatenating associated units need not be a unit. (If it is, then an extension relationship would also exist. Thus, an extension relationship may be regarded as a special kind of an association.)

An "alternative" of a first unit is a different form (which may be a preferred, corrected, or other variant form) of the same expression; for example, FIG. 3 shows that "motel" and "hotel" are alternatives. Other examples of alternatives include "brittany spears" and "britney spears" (different spellings), or "belgian" and "belgium" (different parts of speech). Among a set of alternative units, one may be designated as "preferred," e.g., based on frequency of occurrence; for example, "britney spears" (the correct spelling of the name of the popular singer) might be a preferred alternative to misspelled alternatives such as "brittany spears." Embodiments described herein are case insensitive, and terms that differ only in capitalization (e.g., "belgium" and "Belgium") refer to the same unit; other embodiments may distinguish units based on case and may identify units that differ only in capitalization as alternatives.

In some embodiments, the edges in the concept network may be assigned weights (not shown in FIG. 3), i.e., numerical values that represent the relative strength of different relationships. For example, the edge weight between a first unit and an associated unit may be based on the fraction of all queries containing the first unit that also contain the associated unit, or on the fraction of all queries containing either unit that also contain the other. Weights advantageously reflect relative strength of various relationships and may be normalized in any manner desired. It is to be understood that FIG. 3 is illustrative and that other relationships, as well as other representations of connections or relationships, between different units or concepts might also be used; the term "concept network" as used herein encompasses such alternatives.

In some embodiments, the concept network may be subject to further analysis to identify groups of related units. Examples of such groups include clusters, cliques, and superunits. A "cluster" is a group of units that have at least some neighbor units in common with a base unit. A "clique" is a cluster that further satisfies a closure requirement, e.g., that every member unit in the clique is present in the cluster formed from every other member unit in the clique. A "superunit" refers to a set of units that has some identified characteristic(s) in common. Examples of specific techniques for generating clusters, cliques, and superunits from a concept network may be found in the above-referenced application Ser. No. 10/797,614. Groupings of related units may also be accomplished using other techniques, such as predefined groups created by an editorial team (e.g., a list of major cities).

D. Histogram Vectors

Concept network 300 is advantageously generated from a set of user queries collected over some time period (e.g., a day, a week, multiple weeks, etc.) and may be regenerated from time to time based on different sets of user queries. Thus, concept network 300 can evolve naturally to reflect changing user interests and behavior. Embodiments of the present invention advantageously provide additional features that support analysis of the evolution of concept network 300 and use of such analysis in responding to subsequent user queries, e.g., by detecting or predicting patterns of user interest in particular concepts.

In particular, some embodiments include systems and methods for analyzing a set of concept networks 300 by reference to histogram vectors. One such embodiment uses as inputs a set of "weekly" concept networks, each generated from user queries received during a different week. In general, there will tend to be some overlap between the concept networks (for instance, some units may be found in more than one of the concept networks), but some of the concept networks may include units that are not found in other concept networks. The frequency of a particular unit and/or its relationships to other units may also be different in different concept networks, reflecting changes in user interests.

A "histogram vector" for a unit may be represented as an array that includes an entry corresponding to each of the input concept networks, where each entry reflects the unit's status in the corresponding concept network. In one embodiment, referred to herein as a "bit vector," each entry has a binary value (1 or 0) indicating whether the unit does or does not occur in the corresponding concept network. In another embodiment, the entry stores a value representing the frequency or frequency rank of the unit in the corresponding concept network. For example, the entry value may be proportional to the fraction of all queries for the corresponding concept network that contained a given unit; or the value may reflect the frequency rank of the corresponding unit relative to other units in a given concept network (e.g., a percentile ranking); and so on. Specific techniques for generating histogram vectors are described below. It is to be understood that a histogram vector may also be generated for a combination of units (e.g., based on frequency of occurrence or edge weight for a unit and one of its associations) or for groupings of related units (e.g., clusters, cliques, superunits, etc.).

Histogram vectors may be analyzed in various ways. For example, a group of units that have similar histogram vectors may be identified as being in some way related. Such a relationship may be broadly defined, e.g., "units that are popular in January but not March." Examples of such analyses and their application to formulating responses to subsequent queries are described below.

II. Concept Analysis System

Figure 4:
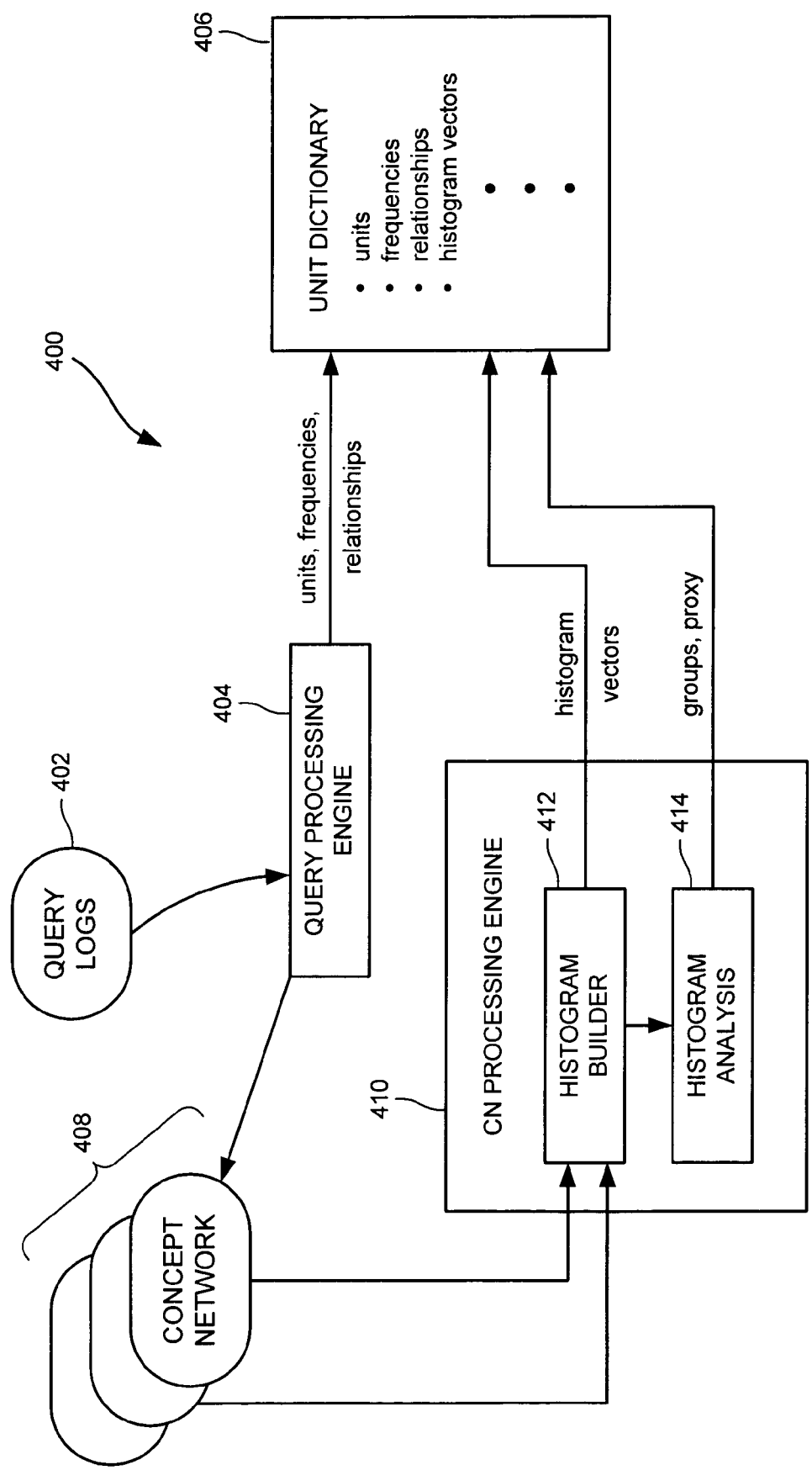
FIG. 4 is a simplified block diagram of a query processing engine according to an embodiment of the present invention.

FIG. 4 is a block diagram of a system 400 for performing concept discovery or concept analysis, including histogram vector generation, according to one embodiment of the present invention. One or more query log files 402 (or actual queries) are received by a query processing engine (also referred to as a query engine) 404, which generates a concept network 408 and a unit dictionary 406. Query engine 404 may be a component of search server system 160 (FIG. 2) or a different system that communicates with search server system 160. Query engine 404 analyzes the content of query log file 402 and generates a concept network 408 that includes units, relationships between units (e.g., extensions, associations, and alternatives), and edge weights for the relationships. This information (or selected portions thereof) may also be stored in unit dictionary 406, which is made available to a real-time query response engine described below.

Unit dictionary 406 may be implemented in any format and stored on any suitable storage media, including magnetic disk or tape, optical storage media such as compact disk (CD), and so on. The content of unit dictionary 406 advantageously includes the units, as well as additional information about each unit, such as relationships (e.g., extensions, associations, alternatives) and statistical data (e.g., edge weights) generated by query processing engine 404. Unite dictionary 406 may also include information obtained by further analysis of one or more concept networks 408. Such information may be generated by concept network (CN) processing engine 410 described below.

A query log file 402 (or an actual query) may be received from various sources over the Internet or through various network connections, e.g., LAN, WAN, direct links, distribution media (e.g., CD, DVD, floppy disk), etc. Examples of sources include search server system 160 (FIG. 2), or multiple search servers 160 in a distributed network of search servers, and one or more of content servers 150. Query log file sources are typically associated with the same organization or entity, e.g., Yahoo! servers, but need not be. The query log files (also referred to as query logs) are processed by query engine 404 using statistical methods such as may be used in information theory or concepts such as mutual information. In some embodiments, daily query logs are used, although logs for different time periods, e.g., hours, weeks, etc. may be used as desired. Query logs typically include actual queries (e.g., text strings) submitted by users and may also include additional information (referred to herein as "meta-information") for some or all of the queries, such as geographic location of querying users, timestamps, IP addresses of client systems, cookies, type of client (e.g., browser type), etc. For example, query log entries might be formatted as <query_string, meta-information> or as <count, query_string> where "count" represents frequency of occurrence. (Frequency may be normalized or not as desired.)

A. Query Processing Engine

Query processing engine 404 processes the query logs 402 to generate one or more concept networks 408. In preferred embodiments, query engine 404 uses the order of search terms within a query to identify one or more units that make up that query. For example, a unit may be a word (e.g., "java") or a group of words that frequently appear adjacent to each other (e.g., "new york city"). The units correspond to nodes (concepts) in the concept network.

Query processing engine 404 also analyzes the units to detect relationships such as extensions, associations, and alternatives. Particular techniques for identification of units and relationships between units (including associations, extensions, and alternatives) are described in detail in above-referenced application Ser. No. 10/713,576 U.S. Pat. No. 7,051,023. It will be appreciated that query processing engine 404 may also implement other techniques in addition to or instead of those described therein, in order to generate each concept network 408. For example, some embodiments of query processing engine 404 may include modules for constructing "superunits" as described in above-reference application Ser. No. 10/797,614. A "superunit" identifies a relationship among some number of member units based, e.g., on common patterns of association of the member units with a "signature" set of non-member units.

A representation of concept network 408 may be stored in unit dictionary 406. In some embodiments, this representation includes the units together with sets of relationships and weights for each unit. In some embodiments, unit dictionary 406 may also include information collected across multiple concept networks 408, such as histogram vectors that may be generated as described below. Various data compression techniques may be used for representing this information in unit dictionary 406.

In a preferred embodiment of the present invention, query processing engine 404 generates multiple concept networks 408 from different subsets of the query logs 402. These subsets might or might not overlap. For instance, a new concept network covering the most recent four weeks might be generated each week; a given query would be included in the inputs to four different concept networks. In another embodiment, a separate concept network could be generated for each week's queries, with a given query included in the inputs to only one concept network.

The query logs may be partitioned, or "binned," for generating different concept networks in any manner desired. For example, a week's worth of queries could be binned into 24 "hourly" bins; a month's (or several months') worth of queries could be binned according to day of the week, weekday vs. weekend day, and so on.

Binning of queries in dimensions other than time is also possible. For example, queries may also be binned in geographic dimensions, user demographic dimensions, and "vertical" dimensions. Binning by geography can be based, e.g., on user location, which can be determined from the user's IP address, Zip code, or similar meta-information provided in the query log, and/or which of a number of different international or regional search servers the user accessed when entering the query (which may also be included in the meta-information or determined based on the source of a particular query log file). Binning by user demographics can be based on any known characteristic of the user, e.g., age, sex, membership in various online forums, etc. Such information may be included in the meta-information of some or all of the queries, or it may be determined based on other meta-information of the query; e.g., for queries entered by registered users, the meta-information may include a username that can be used to access a database that stores demographic information for registered users. The "vertical" dimension as used herein refers generally to aspects of the user's location in cyberspace at the time of submitting a particular query. For instance, a search server site may offer its search interface through various "properties" (e.g., news, financial, sports, shopping, etc.) that are distinguished by different server identifiers and/or URLs. Queries received at different ones of these properties may be separated for analysis.

Figure 5:
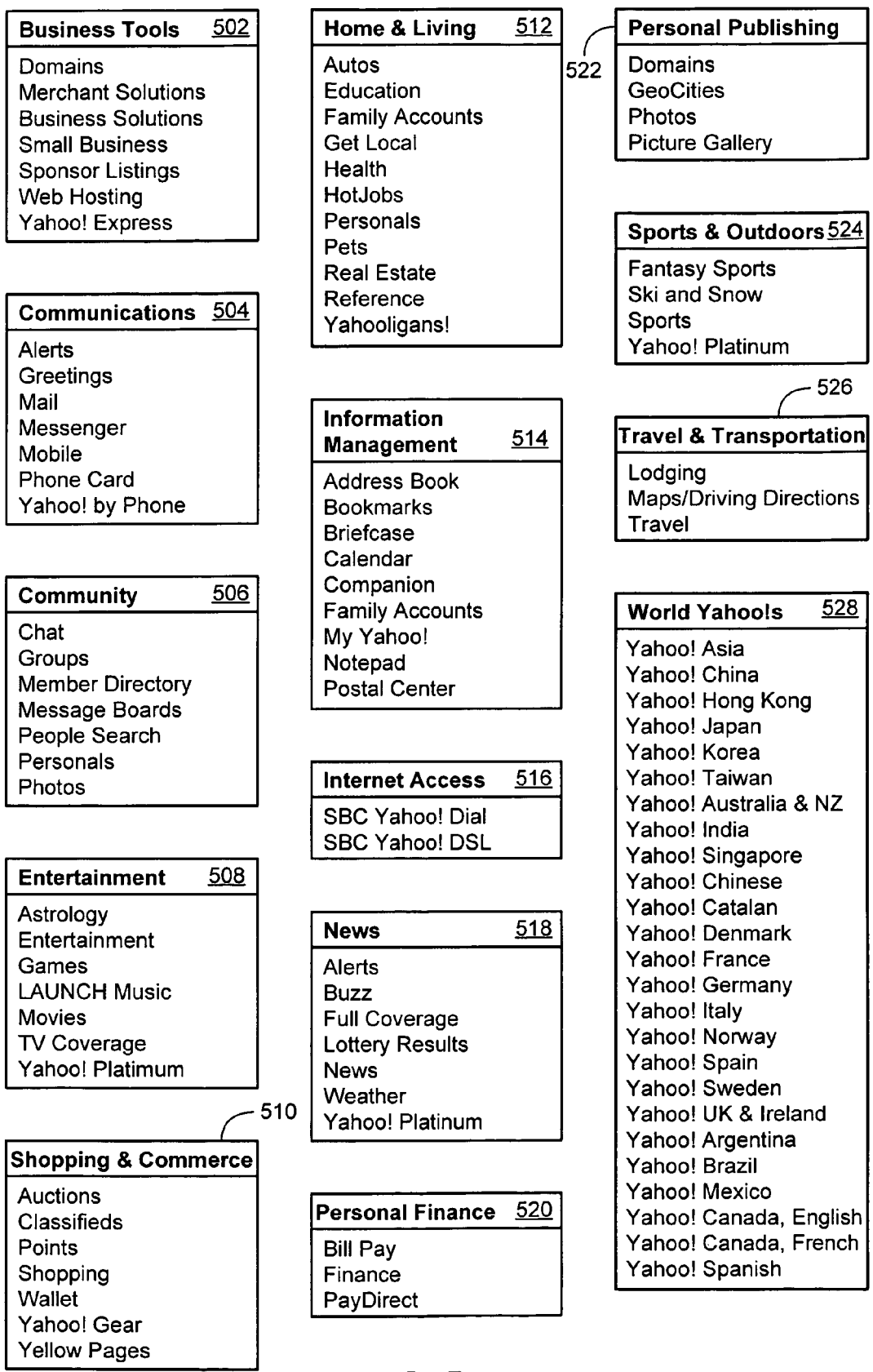
FIG. 5 illustrates a categorical arrangement of properties for defining a vertical dimension according to an embodiment of the present invention.

FIG. 5 is an example of binning in a vertical dimension according to an embodiment of the present invention. Shown therein are names of a large number of properties operated by Yahoo! Inc., assignee of the present application. Queries received at each of these properties may be binned separately, or queries received at multiple properties may be grouped into a category as shown by boxes 502-528, with each category serving as a bin. Some properties may appear in multiple categories (e.g., the "Domains" property appears in the "Business" category 502 and the "Personal Publishing" category 522.)

In some embodiments, binning may be performed in multiple dimensions simultaneously, e.g., based on both time of day and vertical dimension. The bins may include an "unknown" bin for queries where inadequate meta-information is available and/or an "other" bin for grouping together queries whose position along the relevant dimension occurs infrequently or is otherwise of little interest. Depending on the binning scheme chosen, some or all of the queries may be included in more than one bin.

After binning, query processing engine 404 advantageously produces a set of "binned" concept networks 408, where each binned concept network is generated from a different bin of queries along some dimension(s). In some embodiments, each binned concept network 408 is generated by performing a substantially identical concept discovery algorithm on each bin of queries independently. Generation of the binned concept networks may take place in parallel or sequentially as desired. Where the bins include an "unknown" and/or "other" bin, queries in such a bin may be processed or not as desired.

The set of binned concept networks 408 is advantageously ordered in the sense that one of the concept networks can reproducibly be identified as first, another as second and so on. This order may be assigned for convenience and may not need not correspond to a natural order of the dimension or the order in which the binned concept networks 408 were actually generated.

B. CN Processing Engine

Concept networks 408 are advantageously subjected to further processing by CN processing engine 410, which in one embodiment includes a histogram builder module 412 and a histogram analysis module 414. Results from this further processing are advantageously added to unit dictionary 406 for use in responding to subsequent queries.

Figure 6:
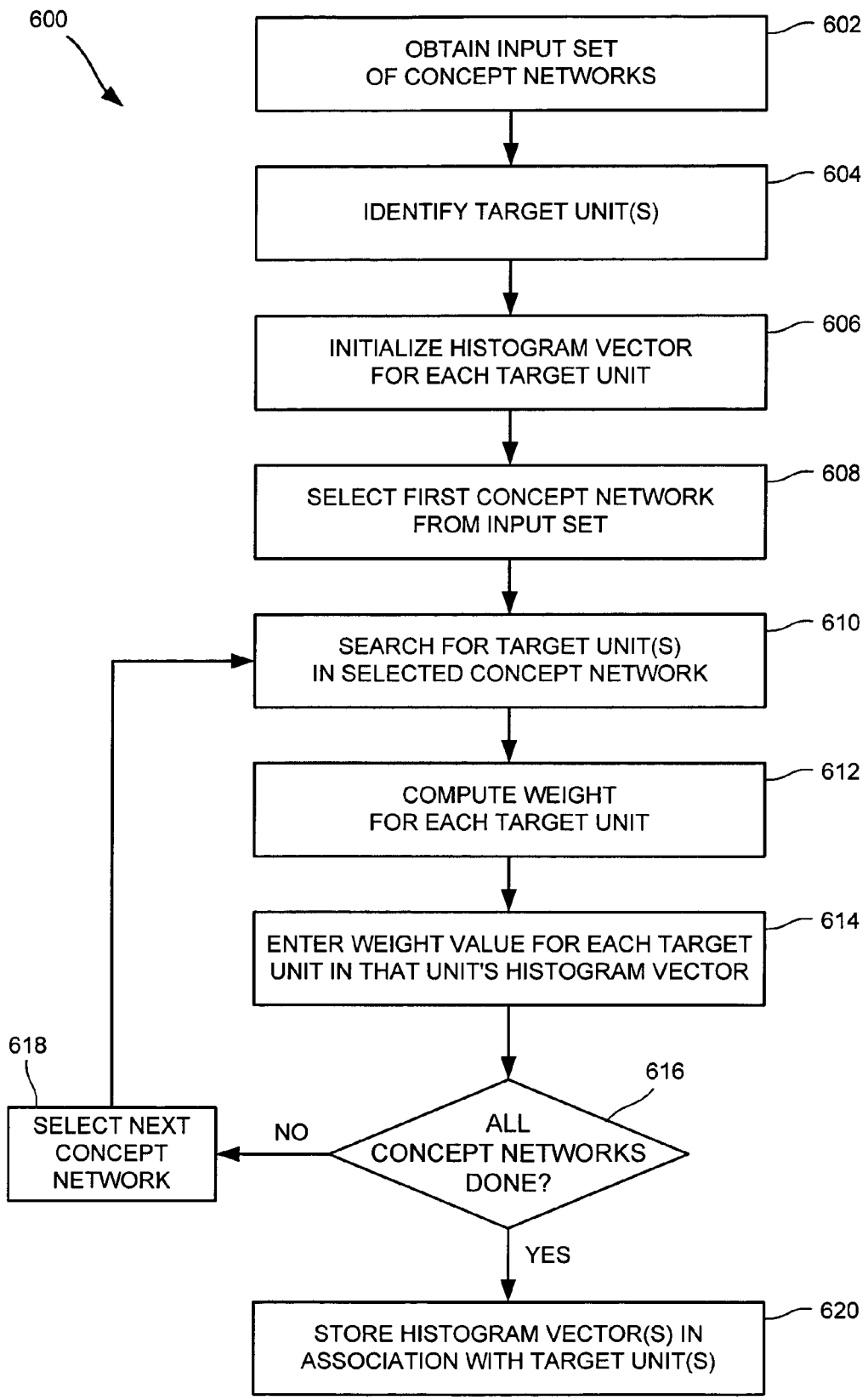
FIG. 6 is a flow diagram of a process for generating histogram vectors according to an embodiment of the present invention.

Histogram builder module 412 constructs histogram vectors for selected units (or all units) in unit dictionary 406, based on a set of concept networks 408 generated by query processing engine 404. FIG. 6 is a flow diagram of a process 600 for constructing histogram vectors according to an embodiment of the present invention. At step 602, an input set of concept networks is obtained; the ordered set of binned concept networks 408 generated as described above may advantageously be used. At step 604, one or more "target" units are selected for analysis. All of the units in unit dictionary 406 may be selected, or target units may be restricted in some way (e.g., analysis may be limited to units whose frequency of occurrence or frequency rank exceeds some threshold). Alternatively, target units may be selected by reference to one or more of the concept networks 408 rather than unit dictionary 406. At step 606, a histogram vector is initialized for each of the target units. The histogram vector advantageously includes one numerical entry for each concept network in the input set obtained at step 602, and the entries may be initialized to zero (or another convenient value).

At step 608, the first concept network 408 in the set is selected, and at step 610, the selected concept network 408 is searched to find each target unit. At step 612, a weight for each target unit is computed. The weight advantageously reflects the frequency of occurrence of the target unit in the selected concept network 408. For example, in one embodiment the weight may be binary, e.g., with a value of 1 if the frequency of the target unit exceeds some threshold and a value of 0 otherwise. In another embodiment, the weight may be proportional to the frequency, with an optional cut-off value below which the weight is set to zero. Frequency may be measured in absolute terms (e.g., total number of occurrences of a given unit) or relative terms (e.g., fraction of all queries used as input for a given concept network that include the target unit). In yet another embodiment, the weight may be based on the frequency rank (e.g., a percentile value of 95 for the most frequent 5% of units, and so on). If a target unit is not found in the selected concept network, the weight is advantageously set to a value (e.g., 0) reflecting the absence of the unit.

At step 614, the weight value for each target unit is stored in the corresponding entry of the histogram vector for that target unit. At step 616, it is determined whether all concept networks in the input set have been processed. If not, then at step 618, the next concept network is selected, and process 600 returns to step 610 to search that concept network for the target unit(s). After all concept networks in the input set have been processed, at step 620 the histogram vector for each target unit is stored in association with that unit in unit dictionary 406. Prior to storing the histogram vector, the vector may be normalized if desired, e.g., by determining a scale factor for the histogram vector and applying the scale factor to each entry. The scale factor may be determined in various ways, e.g., by scaling the largest component to a convenient value (e.g., 1) or by scaling the sum of the entries to a convenient value (e.g., 1). Such normalization may facilitate comparison of histogram vectors of different units or other analyses.

It will be appreciated that the process described herein is illustrative and that variations and modifications are possible. Steps described as sequential may be executed in parallel (and vice versa), order of steps may be varied, and steps may be modified or combined. A histogram vector may be created along any dimension desired, including but not limited to temporal, geographic, demographic and/or vertical dimensions. Multiple histogram vectors reflecting different dimensions and/or different binning schemes in a given dimension may be generated for the same unit or set of units, and any number of histogram vectors may be stored in association with a given unit in the unit dictionary. Weight values for histogram vector entries may be computed in various ways and may optionally be normalized in any suitable manner.

In some embodiments, a histogram vector may also be created for a combination of units. For example, a histogram vector can be constructed based on co-occurrences of a unit and one of its associations in the same query (e.g., "seattle" and "hotels"). As noted above, each concept network 408 advantageously includes edge weights representative of the frequency of co-occurrence of a unit and each of its associations. Accordingly, edge weights for some pair of units can be used as histogram vector entries to construct a histogram vector for that pair.

In still other embodiments, each binned concept network 408 is further analyzed to identify groups of related units as described above. In such cases, histogram vectors may also be generated for some or all of the groups. For example, in each binned concept network 408, a cluster might be formed around the same base unit (e.g., "new york city"). For each binned concept network 408, the aggregate frequency of members of that cluster can be computed and used as an entry in a histogram vector for the cluster. Similarly, if each binned concept network includes a superunit formed from the same starting unit(s), a histogram vector may be constructed using the aggregate frequencies of the member units of that superunit in each binned concept network 408.

Figure 7:
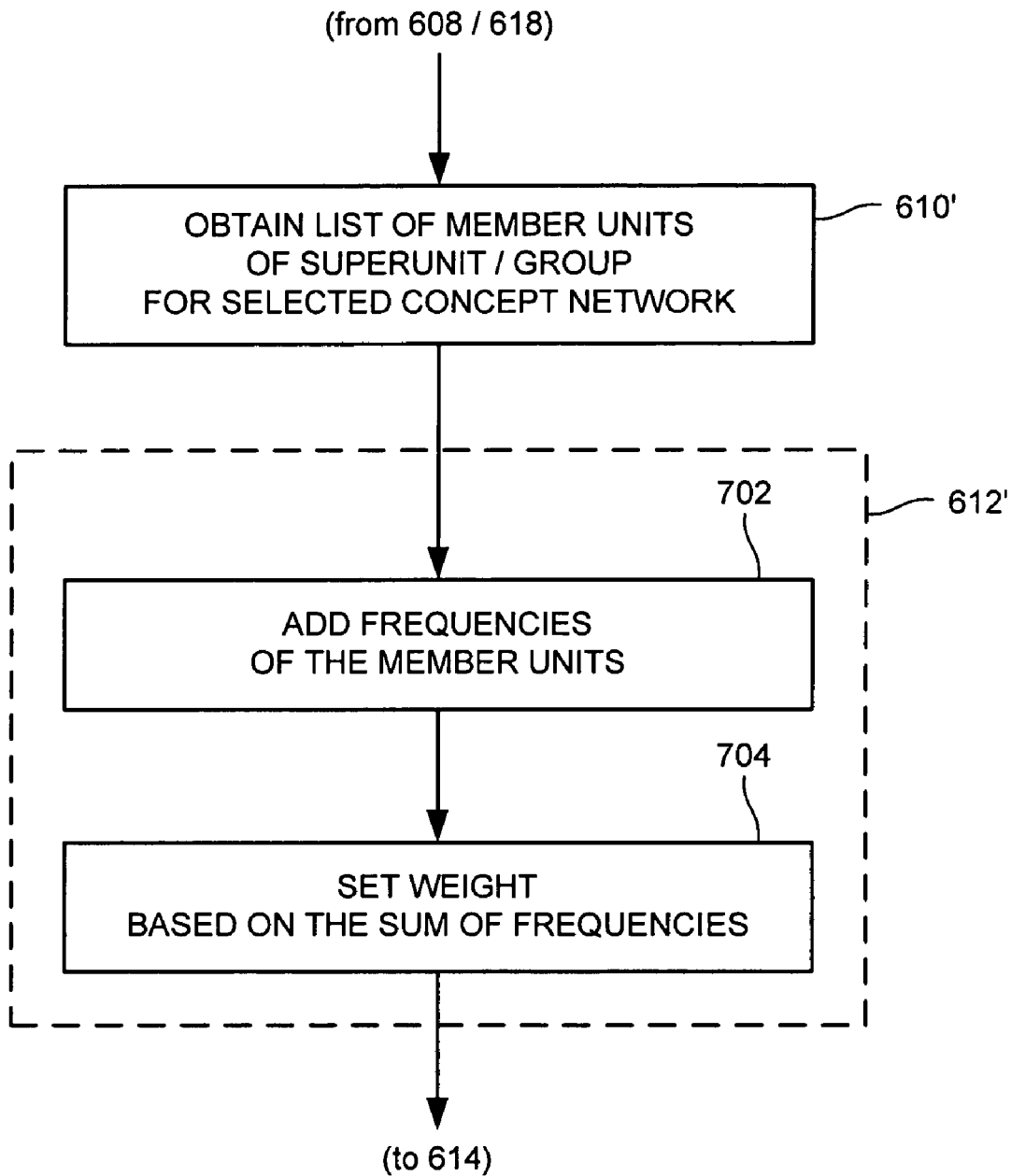
FIG. 7 is a flow diagram of a portion of a process for generating a histogram vector for a group of units according to an embodiment of the present invention.

A process for forming a histogram vector for a superunit (or other group) may be generally similar to process 600 of FIG. 6, with steps 610 and 612 modified as shown in FIG. 7. At step 610', a list of member units of the superunit is obtained from the selected concept network. At step 612', the frequencies of member units identified at step 610' are added (step 702) and the weight value for the superunit is determined (step 704) based on the aggregate frequency obtained at step 702.

Figure 8A:
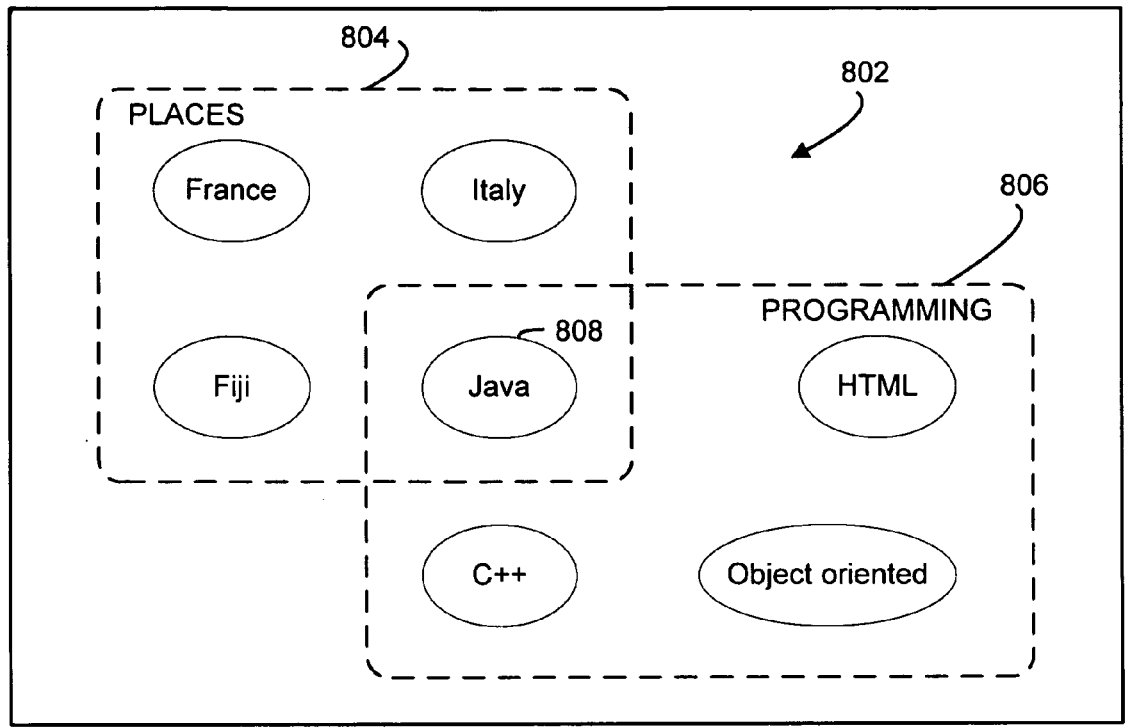
FIGS. 8A-B illustrate membership of superunits in two different concept networks usable for generating a histogram vector according to an embodiment of the present invention.
Figure 8B:
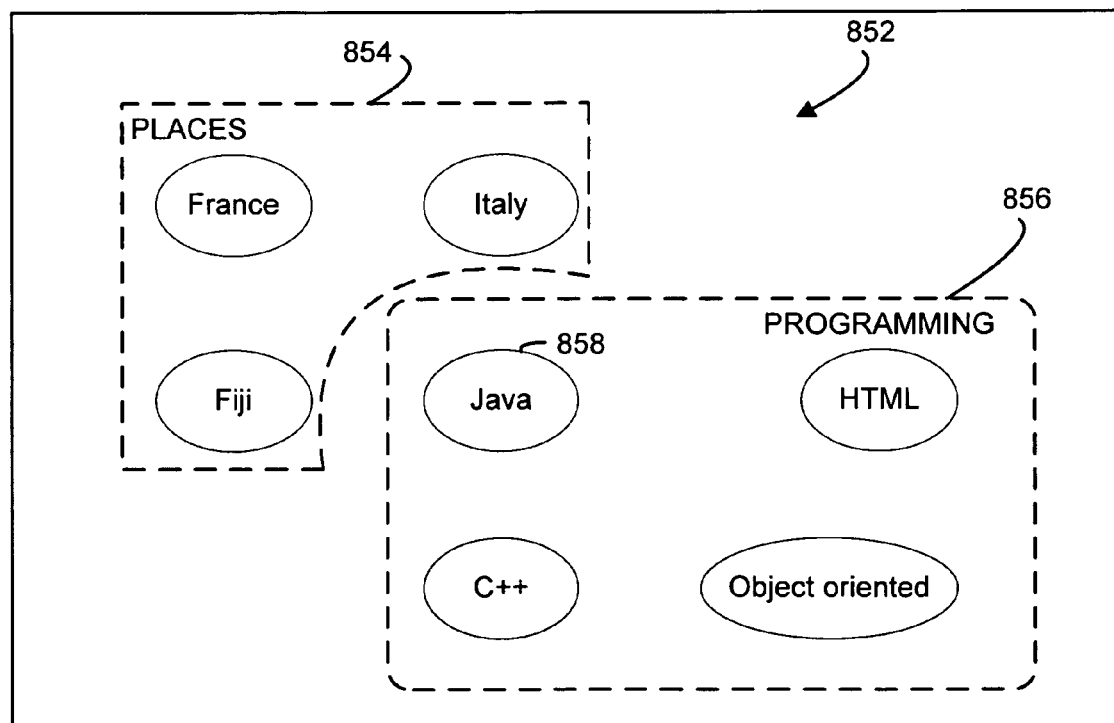

It should be understood that the list of members for the superunit (or other group) may be different in different concept networks. FIGS. 8A-B illustrate selected units from two different concept networks 802 and 852. Each concept network 802, 852 includes a "Places" superunit 804, 854 and a "Programming" superunit 806, 856. In concept network 802, "Places" superunit 804 includes unit "Java" (808), as does "Programming" superunit 806. In concept network 852, "Programming" superunit 856 includes unit "Java" (858), but "Places" superunit 854 does not. If a histogram vector is formed for the "Places" superunit as described above, the frequency of unit "Java" would be included in the aggregate frequency for the entry of concept network 802 but would not be included in the aggregate frequency for the entry of concept network 852. If a histogram vector is formed for the "Programming" superunit, the frequency of unit "Java" would be included for both concept networks 802, 852.

Thus, a superunit (or other group) for which a histogram vector is formed need not have the same set of member units for each concept network 408, as long as the superunits in different concept networks 408 can be identified as "matching" based on some criterion, e.g., being formed from the same starting unit or seed. For example, superunits can be created starting from a short list of member units (or just one member unit), as described in above-reference application Ser. No. 10/797,614. Superunits formed from the same starting list may be regarded as matching, even if the membership is different in different concept networks 408.

Histogram vectors for groups may also be generated in other ways. For example, a canonical list of units belonging to some category (e.g., "cities") may be generated by an editorial team or automatic procedure. A histogram vector for the category may then be created based on aggregate frequencies of the units in the canonical list.

In some embodiments, histogram vectors are also advantageously provided to histogram analysis module 414 (FIG. 4). Histogram analysis module 414 performs further analysis on histogram vectors for some or all of the units. In some embodiments, histogram analysis module 414 receives histogram vectors directly from histogram builder module 412; in other embodiments, histogram analysis module 414 may access unit dictionary 406 or other storage (not shown) to obtain histogram vector data. In general, histogram analysis module 414 may be configured with various algorithms for extracting further information about units and their relationships that can be used in responding to a subsequent query.

Some specific examples of algorithms that may be implemented in histogram analysis module 414 will now be described. It should be understood that these examples are illustrative and not limiting of the present invention.

EXAMPLE 1

Grouping of Units with Similar Histogram Vectors

Figure 9:
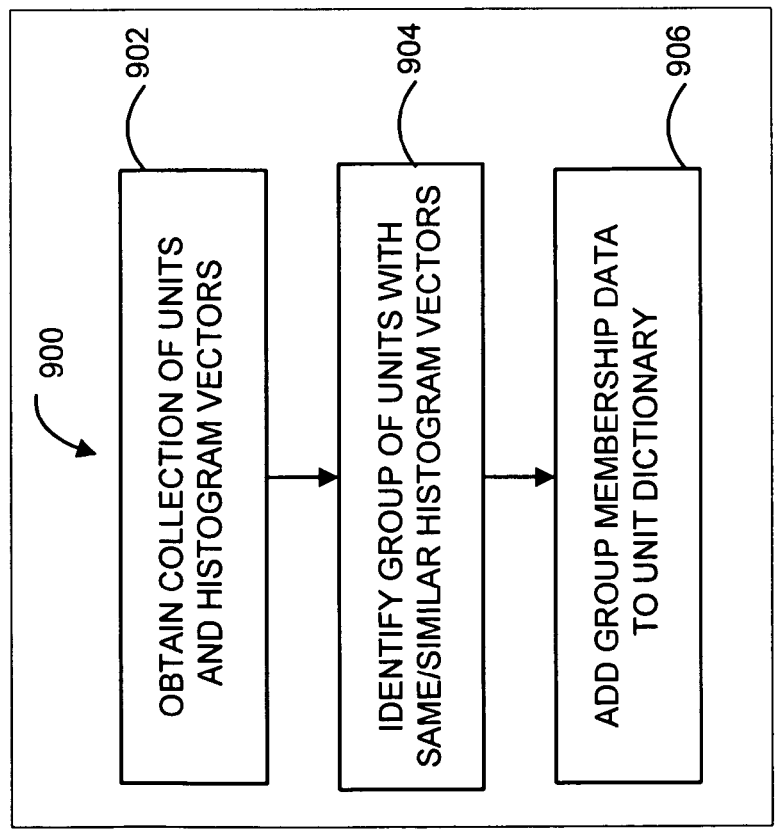
FIG. 9 is a flow diagram of a process for grouping units based on histogram vectors according to an embodiment of the present invention.

FIG. 9 is a flow diagram of a process 900 for discovering relationships among units by grouping units with similar histogram vectors. More specifically, at step 902, a number of units and their respective histogram vectors are obtained. The histogram vectors may be derived from binned concept networks generated for different time periods or along other dimensions as described above; the histogram vector for each unit is advantageously derived from the same set of binned concept networks. In some embodiments, step 902 may include reading histogram vectors from unit dictionary 406 or other storage (not shown).

At step 904, groups of units that have the same histogram vector (or sufficiently similar histogram vectors) are identified. For example, in an embodiment with an n-entry bit vector (i.e., histogram vector where each entry has just one bit), the bit vector may be read as a number in the range from 0 to $2^n-1$, and units may be grouped based on this value. In an alternative embodiment, only a subset of the bits might be considered.

In other embodiments, groups may be defined based on similarity of the overall shape (or aspects of the overall shape) of the histogram. It should be noted that the histogram vector entries may be normalized (or renormalized) during step 904 if desired to facilitate comparison. For example, in one embodiment where the histogram vectors have been normalized so that all entries have values from 0 to 1, similarity may be defined by a rule that specifies a canonical value and/or allowable range for each entry (or for just selected entries); for example, one group may require entry 1 in the range 0.3+/−0.1, entry 2 in the range 0.95+/−0.05 and so on, while another group requires entry 1 in the range 0 to 0.1, entry 2 in the range 0.95+/−0.05, and so on. All units that satisfy such a rule would be grouped at step 904. Any number of groups may be defined by providing a rule for each group, and the possible groups may include an "other" group for histogram vectors that satisfy none of the similarity rules of any expressly defined group.

Different criteria of similarity may also be used. For example, a canonical histogram vector for a group may be defined by specifying a value for each entry, with a unit being a member of the group only if the total deviation (which may be defined, e.g., as a root-mean-squared deviation) between the entries in that unit's (normalized) histogram vector and the canonical histogram vector does not exceed some maximum value. Correlation coefficients and various other statistical techniques may also be employed to determine similarity to a canonical histogram vector. It will be appreciated that similarity rules may be optimized according to the dimension(s) and number of entries represented in the histogram vectors, a desired minimum degree of similarity among members of the group, and so on.

At step 906, the group membership information for various units is added to the unit dictionary 406. Group membership is advantageously represented in a form such that, given one unit in the group, it is possible to identify other units of the group.

It will be appreciated that the "like-vector" groups identified in process 900 may reflect patterns among the units. For example, the frequency of queries involving names of participants in a high-profile criminal case (the defendant, the victim, the attorneys, etc.) may tend to vary from week to week, depending in part on when new developments occur, and the frequencies of queries involving different participants may be correlated. Some embodiments of process 900 are capable of detecting such correlations and grouping the units without intervention by an editorial team. (In other embodiments, an editorial team may review the group membership from time to time and selectively prune uninteresting members.) The frequency correlation may be used by a search system embodiment of the invention to infer that a user who searches for one of the units in the group might also be interested in other members of the group and to suggest such searches to the user.

Other patterns, including non-temporal patterns, may also be discovered. For example, consider histogram vectors generated in a vertical dimension, where searches made from different properties of a search provider may be compared. Certain groups of units (including, e.g., names of consumer products such as "digital camera" or "DVD player") might be searched from the "shopping" property substantially more often than from the "news" property; other groups of units (including, e.g., names of politicians or countries) might have the reverse pattern. From such groupings, it is possible to infer what content is more likely to be of interest to a user who enters a particular query. For example, assuming the above patterns are accurate, it can be inferred that a user at a general search site who enters the query "digital camera" would be more likely to be interested in shopping (and perhaps in other products) than a user at the general search site who enters the name of a politician.

It should be noted that process 900 does not guarantee that there is any conceptual relationship between particular units in a like-vector group and does not guarantee that any particular group will include a complete set of units having a particular conceptual relationship. Process 900 can, however, provide clues as to what relationships might or might not exist, and such clues may help in the process of inferring and responding to likely user intent and/or interests.

EXAMPLE 2

Proxy Histogram Vectors

For some units, a histogram vector may not reveal an underlying pattern of user behavior even where one exists. For instance, consider a histogram vector for the unit "halloween" implemented as a bit vector where each entry represents one week. One would expect an increased interest in Halloween (and thus an increase in the frequency of searches for "halloween") coinciding with the holiday in October. In a bit vector representation, such a pattern might be obscured by other uses of "halloween" (e.g., in reference to the well known "Halloween" movies that might not have strong seasonal fluctuations. In some embodiments of the present invention, it is possible to identify such patterns by finding a proxy histogram vector for a base unit (e.g., "halloween") based on the histogram vectors of related units (e.g., extensions of "halloween") in the concept network.

Figure 10:
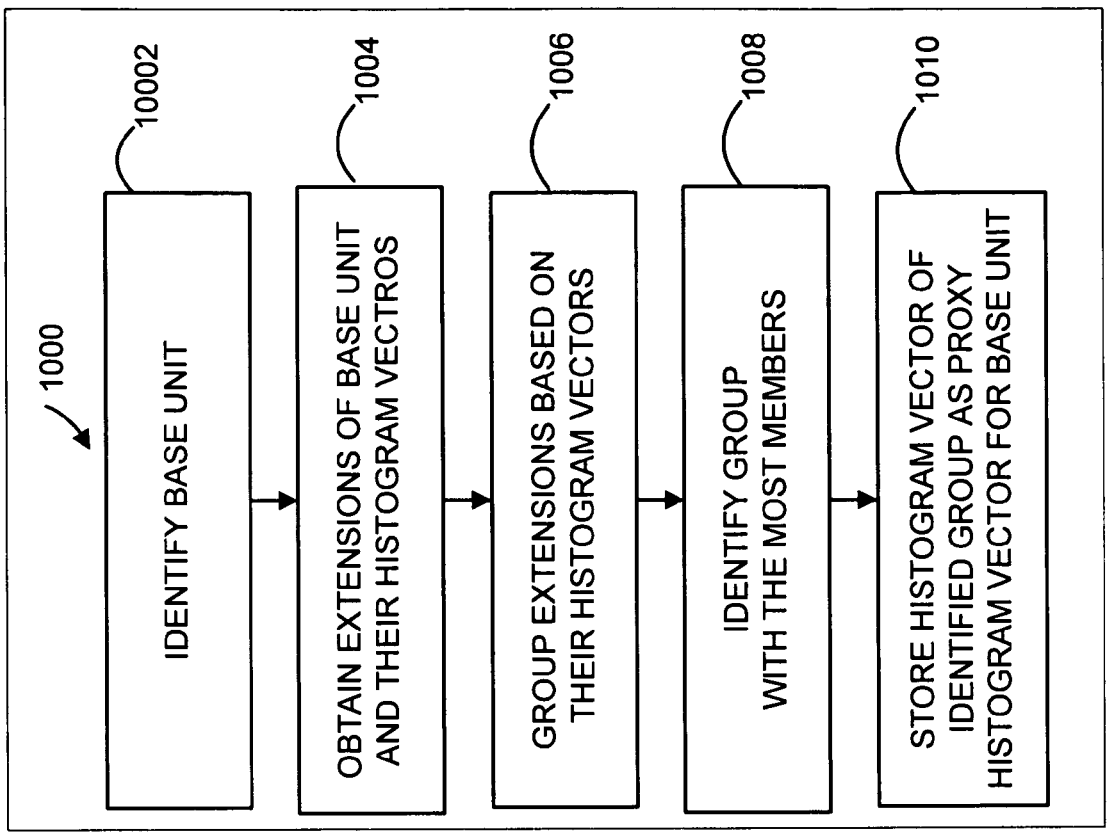
FIG. 10 is a flow diagram of a process for identifying a proxy histogram vector for a unit according to an embodiment of the present invention.

FIG. 10 is a flow diagram of a process 1000 that can be used to generate a proxy histogram vector based on the histogram vectors of extensions (and/or other associations) of a base unit whose histogram vector is uninformative. At step 1002, a base unit for processing is identified. This base unit may be, e.g., a one-word unit with an uninformative histogram vector (such as all 1s in a bit vector representation).

At step 1004, extensions (and/or other associations) of the base unit are obtained, together with their respective histogram vectors. In this embodiment, unit dictionary 406 is advantageously arranged to support lookup of the extensions of a given unit, as well as lookup of the histogram vector for any given unit.

At step 1006, the extensions are sorted or grouped based on their respective histogram vectors. Grouping may be implemented using any of the techniques described above with reference to step 904 of process 900 (FIG. 9) or other suitable techniques for forming groups that have identical or similar histogram vectors. At step 1008, the most populous group (e.g., the group containing the largest number of extensions) is identified. In an alternative embodiment, the aggregate frequency for each grouping of extensions may be computed, and the group having the largest aggregate frequency may be identified as "most populous" at step 1008.

At step 1010, histogram vector of this group (which may be a canonical histogram vector if the members' histogram vectors are not all identical) is identified as a proxy for the base unit's histogram vector and is stored in unit dictionary 406. In some embodiments, the proxy histogram vector replaces the original histogram vector; in other embodiments, both the proxy and original histogram vectors are stored.

Figure 11B:
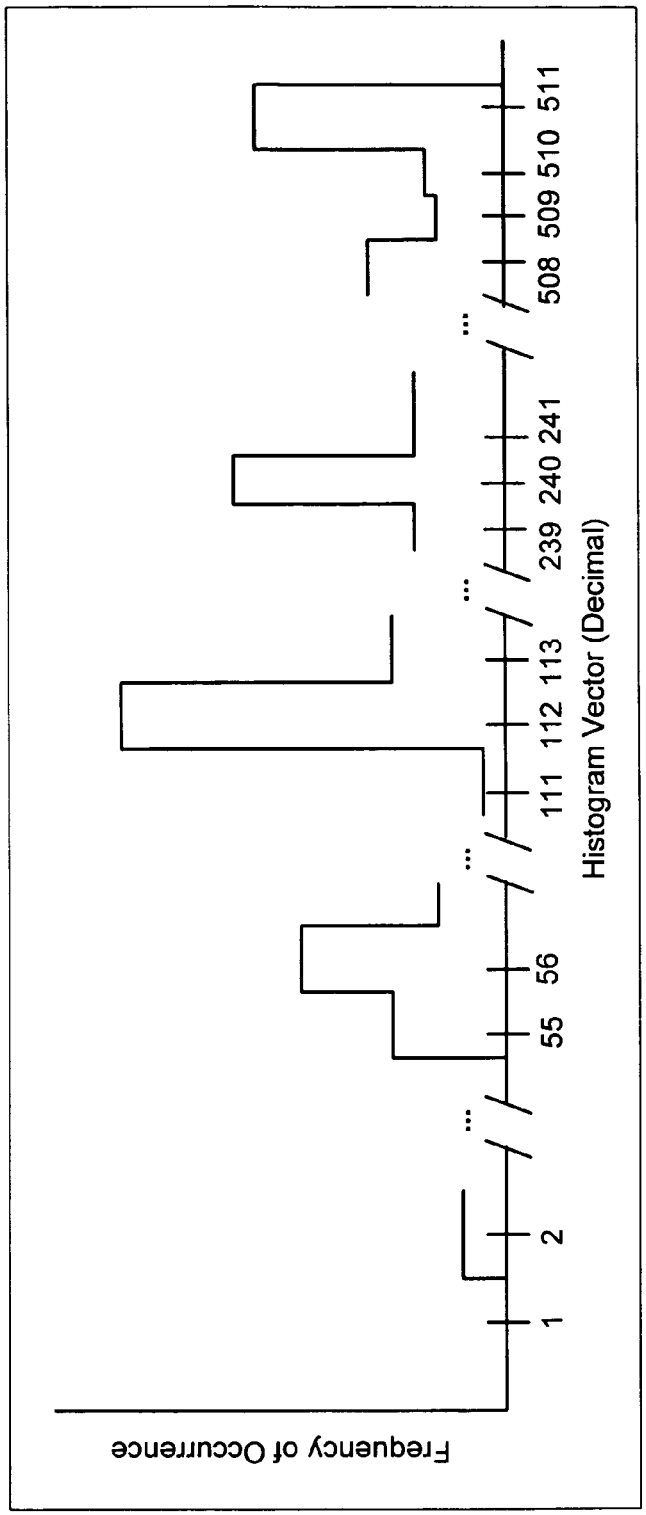

FIG. 11 illustrates an application of process 1000 using extensions of "Halloween". FIG. 11A is a table listing some histogram vectors that might be obtained from a unit dictionary 406 for "Halloween" and various extensions thereof during step 1004 of process 1000. In this example, the histogram vector is implemented as a nine-entry bit vector, with each entry corresponding to a one-week period. The right-hand column shows the bit vector represented as a decimal (base-ten) number from 0 to 511 (i.e., $2^9-1$); at step 1006, the extensions may be grouped based on the bit vector decimal values. FIG. 11B is a bar chart showing the frequency of occurrence (in arbitrary units) of some possible decimal values; such data may be obtained during step 1006. In FIG. 11B, the frequency of occurrence for a decimal value is proportional to the number of extensions of "halloween" whose bit vectors are represented by that decimal value.

In FIG. 11B, decimal value "112" (bit vector 001110000 in FIG. 11A) is the most frequently occurring. Accordingly, at step 1010, this bit vector would be selected as the proxy bit vector for "halloween" and stored in unit dictionary 406 as described above.

In some instances, the extensions (and/or other associations) of a base unit may be resolvable into groups based on histogram vectors along some dimension. For instance, the base unit may have two different contexts or word senses (e.g., "java", which may refer to an island, a programming language, or coffee), and the pattern of searches where different senses are intended may be different along some dimension (e.g., users may search for "java" in the programming language sense during the week and in the coffee sense on weekends). Accordingly, the histogram vectors in that dimension for extensions or associations that relate to different senses may tend to be different, while the histogram vectors for extensions or associations that relate to the same sense may tend to be similar. The extensions (or associations) can be grouped based on their respective histogram vectors, similarly to the group identification procedure of Example 1 described above. When a subsequent user enters an ambiguous query containing the base unit, information about that user's "position" along the dimension where the correlation was found can be used to infer the user's intent as being more likely to coincide with one or another of the groups.

III. Query Response

Figure 12:
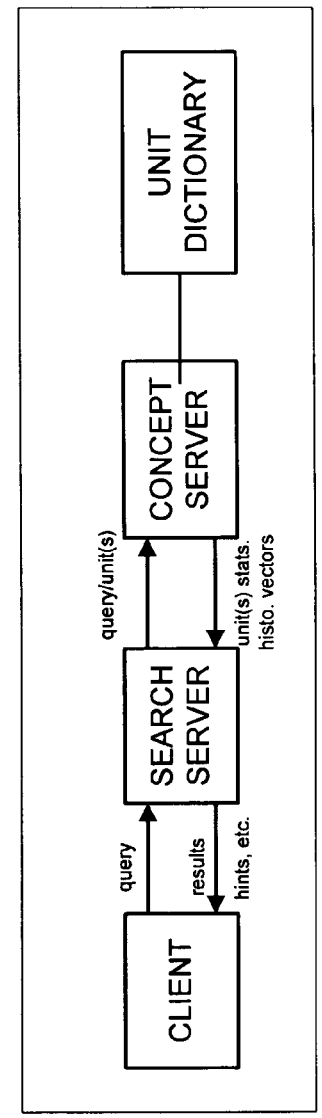
FIG. 12 is a simplified block diagram of a system including a unit dictionary and associated processing intelligence, including a query processing engine in some aspects, according to an embodiment of the present invention.

In another embodiment of the invention, information obtained by analysis of the histogram data is used to help tailor a search query response to a particular user's interest by taking evolutionary aspects of the concept network into account. FIG. 12 shows a methodology that can be used by system 110 of FIG. 2 to respond to a query. Client 120 transmits a query to search server system 160. Search server system 160 sends the query and/or its constituent units to a concept server 180, which accesses unit dictionary 406. Concept server 180 returns conceptual data related to the query, such as one or more units identified from the query along with statistics and cluster information for the various units, as well as histogram vector information related to the units. This information may be derived, e.g., by hashing the query to identify units contained therein and accessing unit dictionary 406 to retrieve entries for each identified unit. In this embodiment, unit dictionary 406 includes any information about the units and their relationships that is to be made available during query processing and may include a representation of one or more concept networks in full or in part. In one embodiment, the returned information includes the units, statistics, and histogram vector information that are associated with the query, one or more of its constituent units, or one or more extensions, associations, or other related units of the constituent units.

Search server system 160 advantageously uses the conceptual data received from concept server 180 in responding to the query. The results returned by search server system 160 advantageously include results responsive to the user's query to the user along with other related information, such as hints and tips about what the user might want to explore next based on understanding of user needs as captured in units and their extensions and associations, including histogram vectors and information derived therefrom.

For example, in one embodiment, there is a current concept network 408 that is used to define the extensions, associations, and/or other relationships for some set of units in the current Unit dictionary 406. A User Whose Query Includes a Particular Unit that Appears in Unit Dictionary 406 may be prompted to perform a related search using one or more "suggestions" that can be selected based, e.g., on the associations and extensions of that unit. Specific techniques for identifying suggestions for related searches are discussed in detail in above-referenced application Ser. No. 10/713, 596 U.S. Pat. No. 7,051,023. A user may, of course, enter a query that does not include any units in the current concept network 408 but does include a unit that existed in a previous concept network 408. Unit dictionary 406 may include a list of such "expired" units, along with histogram vectors that indicate which previous concept network(s) 408 included the expired unit. This information can be used to access a previous version of unit dictionary 406 that has relationships of the expired unit from which suggestions can be generated. For example, concept server 180 may access the most recent version of unit dictionary 406 that was defined from a concept network 408 that includes the expired unit.

As another example, units may be grouped based on similarity of their histogram vectors as described above, with "like-vector" group membership information being stored in unit dictionary 406. Search server 160 may make use of this group membership information in responding to a user's query. For instance, if a unit in the query belongs to a particular like-vector group, search server 160 might suggest one or more other members of that group for related searches. Like-vector group membership might also be used as a basis for selecting sponsored content to be displayed, or for determining a ranking or order for presenting search results (e.g., web pages that include several members of the group might be given a higher rank; number of group members included in a page might also be combined with other criteria, such as frequency of occurrence of query terms; and so on). In this context, proxy histogram vectors described above might be used to determine the group membership of at least some units.

As yet another example, if a search query is ambiguous, the user's intent can be inferred based at least in part on groupings of the extensions and associations of that unit, as described above. For example, if the user's "position" along one or more dimensions make one group of extensions and associations more likely than another (based on their histogram vectors), related searches based on the more likely extensions and associations may be suggested first, search hits (e.g., links to web pages or sites containing query terms) may be ordered such that those related to the more likely context appear first, and so on.

As still another example, in some embodiments, unit dictionary 406 includes histogram vectors along the vertical dimension. The histogram vector for a unit of a user query in the vertical dimension can be retrieved from unit dictionary 406 and used to determine which property is most often searched for that unit. Results associated with the most-searched property may be given a higher ranking (e.g., they may be presented first), regardless of which property the user actually searched from. This may increase the likelihood that the user will quickly find relevant content.

As a further example, histogram vectors can be used to predict increasing user interest in recurring events. In one such embodiment, histogram vectors along the time dimension are created independently for each week over an extended length of time (e.g., one year, two years, or longer). Histogram vectors for units related to recurring events (e.g., "Halloween", "Super Bowl") may show a pattern of user interest that peaks at about the same time each year, then falls off until the following year. This information can be used to predict, e.g., that users will likely be more interested in "Halloween" related searches next October, and links and/or other content related to "Halloween" can be given prominent placement during October (and less prominent placement during November), without requiring invention by an editorial team.

It should also be noted that histogram vectors may be used to implement a wide variety of trend analysis techniques that can be used to determine likely user intent. Some examples of trend analysis techniques are described in above-referenced application Ser. No. 10/712,307 U.S. Pat. No. 7,240,049. Implementing the analyses described therein using histogram vectors will be straightforward to a person of ordinary skill in the art with access to the teachings of the present disclosure.

It will be appreciated that the foregoing examples are illustrative and not limiting of the scope of the invention. Histogram vector analysis may be used in a wide variety of ways for inferring the likely intent of a user who enters a particular query and selecting relevant content (or links to content) to be provided to that user. In particular, information from histogram vectors may be combined with other available data about the units and/or the user who entered the query to refine the inference of likely intent.

IV. Further Embodiments

While the invention has been described with respect to specific embodiments, one skilled in the art will recognize that numerous modifications are possible. For instance, the number and specificity of dimensions and subsets of queries used for histogram vector analysis may vary, and not all queries received need be used for histogram vector analysis. Concepts (units), relationships, and histogram vectors can be defined dynamically, and histogramming can be performed from time to time (e.g., daily or weekly) to reflect changing user behavior. In still other embodiments, queries may be processed as they are received so that concept network data for one or more concept networks is updated substantially in real time; histogram vector updates may be coordinated with the concept network updates. The automated systems and methods described herein may be augmented or supplemented with human review of all or part of the resulting unit dictionary, including the units, relationships, histogram vectors, and the like.

The embodiments described herein may make reference to web sites, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

Thus, although the invention has been described with respect to specific embodiments, it will be appreciated that the invention is intended to cover all modifications and equivalents within the scope of the following claims.

What is claimed is:

1. A computer-implemented method for analyzing user search queries, the method comprising the acts of:
   grouping a set of previous queries into a plurality of subsets along a dimension;
   for each of the subsets of the previous queries, generating a concept network, each concept network including a plurality of units and a plurality of relationships defined between the units, wherein each unit of each concept network has a frequency weight;
   selecting one of the units;
   constructing a histogram vector for the selected unit, the histogram vector having an element corresponding to each of the concept networks, wherein each element of the histogram vector has a value representative of the frequency weight of the selected unit in the corresponding one of the concept networks; and
   storing the histogram vector on a data store accessible by a processor.

2. The method of claim 1, wherein the dimension is a time dimension.

3. The method of claim 1, wherein the dimension is defined by reference to one or more demographic characteristics of users.

4. The method of claim 1, wherein the dimension is a geographic dimension.

5. The method of claim 1, wherein the dimension is a vertical dimension representing a user context of the query.

6. The method of claim 1, further comprising the act of storing the selected unit in a unit dictionary in association with the histogram vector.

7. The method of claim 6, further comprising the acts of:
   receiving a subsequent query;
   parsing the subsequent query into one or more constituent units;
   obtaining the histogram vector for at least one of the constituent units from the unit dictionary; and
   responding to the subsequent query based at least in part on the histogram vector.

8. The method of claim 7, wherein the act of responding further includes suggesting a related search based at least in part on the histogram vector.

9. The method of claim 7, wherein the act of responding further includes resolving an ambiguity of one of the constituent units based at least in part on the histogram vector.

10. The method of claim 6, further comprising the acts of:

identifying a group of units that have similar histogram vectors; and storing group membership information for the units of the group in the unit dictionary.

11. The method of claim 6, further comprising the acts of:
selecting a base unit from the unit dictionary;
identifying a plurality of related units for the base unit in the unit dictionary;
determining a most common histogram vector among the related units; and
storing the most common histogram vector in the unit dictionary as a proxy histogram vector for the base unit.

12. The method of claim 11, wherein the related units include extensions of the base unit.

13. The method of claim 1, wherein each element of the histogram vector has a binary value indicating a presence or absence of the target unit in the corresponding concept network.

14. The method of claim 1, further comprising the act of normalizing each of the histogram vectors.

15. A system for processing queries, the system comprising:
a concept network builder module configured to receive a set of previous user queries and to generate a concept network therefrom, the concept network including a plurality of units and a plurality of relationships defined between the units, wherein each unit of the concept network has a frequency weight;
a histogram builder module configured to receive a plurality of concept networks generated by the concept network builder from different sets of previous user queries and further configured to select one of the units and to generate a histogram vector for the selected unit, wherein the histogram vector has an element corresponding to each of the concept networks, wherein each element of the histogram vector has a value representative of the frequency weight of the unit in the corresponding one of the concept networks; and
storing the histogram vector on a data store accessible by a processor.

16. The system of claim 15, further comprising a unit dictionary configured to store the selected unit in association with the histogram vector generated from the selected unit by the histogram builder module.

17. The system of claim 16, further comprising a histogram analysis module configured to obtain units and histogram vectors for those units from the unit dictionary and to detect a pattern of the histogram vectors.

18. The system of claim 17, wherein the histogram analysis module is further configured to select a plurality of units from the unit dictionary, to sort the selected units based on the histogram vectors, and to define a group of units that have similar histogram vectors.

19. The system of claim 17, wherein the histogram analysis module is further configured to select a base unit from the unit dictionary, to identify a plurality of related units for the base unit in the unit dictionary, to determine a most common histogram vector among the related units, and to store the most common histogram vector in the unit dictionary as a proxy histogram vector for the base unit.

20. The system of claim 16, further comprising a query response module configured to receive a subsequent query including one or more constituent units and to respond to the subsequent query based at least in part on a histogram vector stored in the unit dictionary for at least one of the constituent units.

21. A computer program product comprising a computer readable medium encoded with program code, the program code being executable by a processor, the program code including:
program code for grouping a set of previous queries into a plurality of subsets along a dimension;
program code for generating a concept network for each of the subsets of the previous queries, each concept network including a plurality of units and a plurality of relationships defined between the units, wherein each unit of each concept network has a frequency weight;
program code for selecting one of the units;
program code for constructing a histogram vector for the selected unit, the histogram vector having an element corresponding to each of the concept networks, wherein each element of the histogram vector has a value representative of the frequency weight of the selected unit in the corresponding one of the concept networks; and
program code for storing the histogram vector on a data store accessible by the processor.

22. The computer program product of claim 21, wherein the program code further includes program code for storing the selected unit in a unit dictionary in association with the histogram vector.

23. The computer program product of claim 21, wherein the program code further includes:
program code for receiving a subsequent query;
program code for parsing the subsequent query into one or more constituent units;
program code for obtaining the histogram vector for at least one of the constituent units from the unit dictionary; and
program code for responding to the subsequent query based at least in part on the histogram vector.

* * * * *